United States Patent [19]

Madej

[11] 4,417,711

[45] Nov. 29, 1983

[54] PIPE HANGER

[75] Inventor: Edward A. Madej, Verona, Pa.

[73] Assignee: Robroy Industries, Verona, Pa.

[21] Appl. No.: 378,754

[22] Filed: May 17, 1982

[51] Int. Cl.³ .............................................. F16L 3/08
[52] U.S. Cl. ................................ 248/74 R; 403/158; 411/379
[58] Field of Search .................... 248/74 R, 62, 73, 72; 411/338, 339, 377, 311, 542, 301, 378, 373, 379; 285/45; 403/158, 159; 220/3.8

[56] References Cited

U.S. PATENT DOCUMENTS

| | | | |
|---|---|---|---|
| 3,226,069 | 12/1965 | Clarke | 248/73 |
| 3,486,726 | 12/1969 | Kindorf et al. | 248/72 |
| 3,527,432 | 9/1970 | Lytle | 248/62 |
| 3,650,499 | 3/1972 | Biggane | 248/74 R |
| 3,724,706 | 4/1973 | Slocum | 220/3.8 |
| 3,799,584 | 3/1974 | Slocum | 285/45 |
| 4,296,950 | 10/1981 | Chamberlin | 285/45 |
| 4,297,063 | 10/1981 | Hart | 411/338 |
| 4,310,273 | 1/1982 | Kirrish | 411/338 |

Primary Examiner—William H. Schultz
Assistant Examiner—Ramon O. Ramirez
Attorney, Agent, or Firm—Stanley J. Price, Jr.; John M. Adams

[57] ABSTRACT

A first clamp member and a second clamp member are positioned in opposed spaced relation with a conduit, pipe or the like, positioned therebetween. Each clamp member has a body portion including an engaging end portion adapted for attachment to a structural support and an opposite connecting end portion. An intermediate portion having an arcuate configuration extends between the engaging and connecting end portions and is adapted to receive and support the conduit. A moisture resistant, polymeric material covers the clamp member body portions so that the clamp members are completely encapsulated to seal out the effects of moisture. A bore extends through the connecting end portion of each clamp member. In assembly, the bores are oppositely aligned to receive a fastening element which draws the connecting end portions together for engagement of the intermediate portions with the periphery of the conduit. The polymeric coating extends outwardly from the opposed sides of each clamp member around the bores to form a moisture resistant seal for encapsulating the fastening element. The seal includes telescoping elements movable one within the other to permit selective spacing of the clamp members to accommodate a range of conduit sizes. Thus, the clamp members are usable with more than a single size of conduit and the fastening element remains completely encapsulated within the moisture resistant seal for each size of conduit received between the clamp members.

12 Claims, 6 Drawing Figures

PIPE HANGER

BACKGROUND OF THE INVENTION

1. Field of the Invention

This invention relates to a pipe hanger and more particularly to a pair of clamp members coated with a moisture resistant polymeric material and connected at one end to a structural element and at an opposite end to each other by a fastening element encapsulated within a moisture resistant seal.

2. Description of the Prior Art

Pipe clamps are well known in the art for securing a conduit, pipe or the like to a structural element, such as a beam member, a U-shaped channel, a cable tray, or the like. Typical of the known pipe hangers are the arrangements disclosed in the following U.S. Pat. Nos. 2,375,513; 2,846,169; 3,226,069; 3,417,951; 3,527,432; 3,547,385; and 3,650,499. These devices include a pair of complementary clamping plates each having a curved configuration with one end notched to form a shoulder to engage the flange of a supporting channel and an opposite end portion having a bore for receiving a bolt to draw together the clamp members to securely grip the conduit.

One of the disadvantages of the known pipe hangers is that the clamp plates, as well as the threaded connection of the bolt in the threaded bores of the clamp plates, are subject to corrosive damage when exposed to a corrosive environment. In many applications, the clamp plates are located in an environment where moisture and other chemicals can damage the substrate of the plates and "freeze" the threaded connection of the bolt to the plates. Eventually, the clamp plates require maintenance or replacement, which can be difficult when the bolt becomes "frozen" on the plates.

It is also well known in the art, as disclosed in U.S. Pat. Nos. 3,724,706; 3,784,236; 3,799,584; and 4,316,690, to coat components of an assembly that must be capable of efficient assembly and disassembly in a corrosive environment. These devices include a moisture resistant, insulating, resilient polymeric coating, such as polyvinylchloride (PVC) applied to the exposed metal substrate. It is also known, as disclosed in these patents, to provide male and female interconnecting elements coated with a polymeric material to form a moisture resistant seal therearound. This prevents moisture from entering the point of engagement, for example, of a nut on a threaded bolt, to prevent the nut from "freezing" on the bolt.

While it is known to coat the components of interconnecting members with a moisture resistant, polymeric coating, the threaded surfaces of the members are generally exposed prior to assembly of the components in the field. For example, even though portions of nuts and bolts are coated, the threaded portions are exposed to the atmosphere and to the effects of moisture prior to assembly.

It is also known to apply a moisture resistant, polymeric material by brush coating exposed connecting elements, such as nuts and bolts. However, a moisture resistant coating applied in this manner to threaded connections of fastening elements is not always successful in preventing corrosion in a deleterious atmosphere. It has been found in most cases that brush coating of a polymeric material, after installation, will not deter the accumulated effects of the corrosive atmosphere prior to the application of the coating. Furthermore, if improper attention is given to the brushing application of the polymeric material to the exposed threads, an insufficient coating thickness to prevent corrosion may result.

Therefore, there is need for a pipe hanger and the like operable in a corrosive environment to resist corrosive damage to the elements of the pipe hanger prior to installation and after installation and usable for a range of pipe diameters.

SUMMARY OF THE INVENTION

In accordance with the present invention, there is provided a conduit hanger that includes a first clamp member and a second clamp member positioned in opposed, spaced relation. Each of the clamp members has a body portion including an engaging end portion for positioning on a structural support, a connecting end portion and an intermediate portion. The intermediate portion has an arcuate configuration extending between the engaging end portion and the connecting end portion and is adapted to receive and support a conduit. A moisture resistant, polymeric coating encapsulates the clamp member body portion. A bore extends through the connecting end portion of each of the clamp members. The coating forms a seal extending outwardly on opposed sides of each clamp member in surrounding relation with the bore. The seal is telescopically movable to form an extensible sealed passageway between the clamp members. A fastening element connects the first and second clamp members to move the connecting end portions toward one another to securely hold a conduit between the intermediate portions. The fastening element extends through the bores and is positioned within the passageway to provide a moisture resistant seal around the fastening element.

The seal is an extension of the polymeric coating on both the first and second clamp members. On the first clamp member, the seal extends outwardly from both sides of the clamp member in surrounding relation with the bore through the connecting end portion. The seal includes a sealing flange element extending from one side of the clamp member and a socket element extending from the opposite side of the clamp member.

The sealing flange element and the socket element are axially aligned with the bore through the first clamp member. In a similar arrangement, the seal on the second clamp member includes an insert element and a boot element extending from opposite sides of the second clamp member surrounding the bore.

The insert element and the boot element are axially aligned with the bore. In assembly, the insert element of the second clamp member is positioned oppositely of the socket element of the first clamp member so as to permit the insert element to be telescopically received within the socket element. This arrangement forms the extensible sealed passageway between the clamp members. The insert element is movable within the socket element to increase and decrease the length of the sealed passageway to permit adjustments in the distance between the clamp members as required to accommodate a range of pipe diameters while maintaining the portion of the fastening element extending between the clamp members completely encapsulated within a moisture resistant seal.

The boot element formed integral with the polymeric coating on the second clamp member is preferably internally threaded to receive the threaded end of the fastening element. The boot element has a sufficient length to maintain the end of the fastening element encapsulated for the range of adjustments made to the spacing between the clamp members as determined by the diameter of the pipe being clamped.

Preferably, the fastening element includes a bolt or the like, having a head coated also with polymeric material, forming a cap sealingly engageable with the sealing flange element on the first clamp member. Thus, as the fastening element is advanced through the sealed passageway between the clamp members and the bores thereof, the polymeric cap sealingly engages the sealing flange element. The fastening element is completely encapsulated along its entire length to prevent moisture and other corrosive elements from coming in contact with the fastening element. Furthermore, the fastening element remains effectively sealed prior to installation of the pipe hanger, after installation, and while adjustments are made to accommodate a change in pipe size.

A further feature of the present invention includes each clamp member engaging end portion being provided with a bearing surface coated with the polymeric material. The bearing surface receives the flange of a U-shaped channel or a cable tray to support the clamp members therefrom. The coated bearing surface distributes the bearing load over a relatively wide surface area to stabilize the connection of the clamp members to the channel.

Accordingly, the principal object of the present invention is to provide a pipe hanger that includes a pair of interconnecting clamp members completely encapsulated by a moisture resistant, polymeric material that prevents exposure of the clamp substrate to the damaging effects of a corrosive environment.

A further object of the present invention is to provide a pipe hanger for securing a conduit to a supporting structure and adjustable to accommodate a range of pipe diameters by adjusting the spaced apart distance between the clamp members.

A further object of the present invention is to provide a pipe hanger formed by a pair of clamp members coated with a moisture resistant, polymeric material and connected by a fastening element that remains sealed from the effects of a corrosive environment during preassembly and assembly of the pipe hanger on a structural support.

These and other objects of the present invention will be more completely disclosed and described in the following specification, the accompanying drawings and the appended claims.

DESCRIPTION OF THE PREFERRED EMBODIMENT

Figure 1:
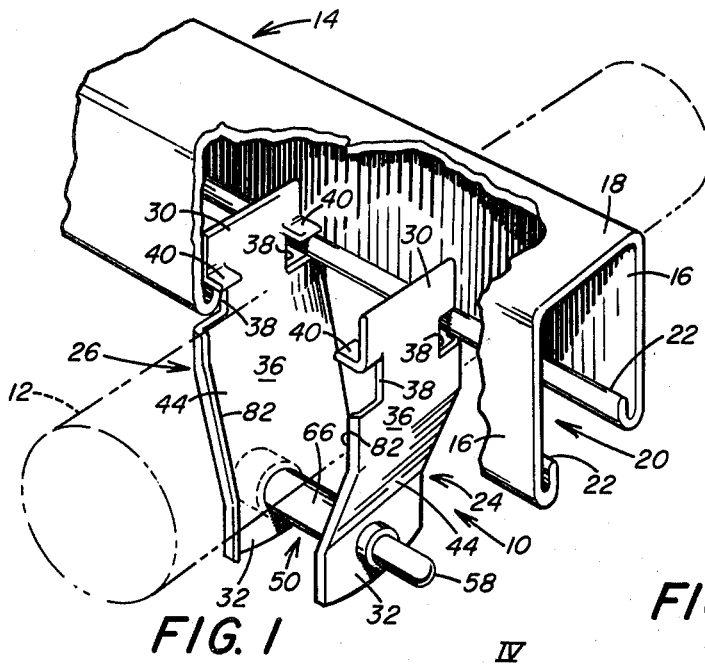
FIG. 1 is a fragmentary, isometric view of a pipe hanger connected to a structural support, illustrating a pair of clamp members of the pipe hanger coated with a polymeric material and connected to one another by a fastening element encapsulated within a moisture resistant seal.

Referring to the drawings, and particularly to FIGS. 1-4, there is illustrated a pipe hanger generally designated by the numeral 10 for securing a conduit, such as a pipe 12, to a structural support, such as a cable tray or a U-shaped channel member 14 illustrated in FIG. 1. In a manner well known in the art, the channel member 14 depends from a ceiling or other overhead structure (not shown) to support pipes, conduits, or the like. The pipe 12 may be positioned in underlying relation with the channel member 14, as illustrated in FIG. 1, or the channel member may be inverted so that the pipe 12 is positioned in overlying relation with the channel member 14.

The channel member 14 is conventional in design and preferably includes a pair of spaced apart side walls 16 connected by a web portion 18, thereby forming a U-shaped longitudinal channel 20. The free end portions of the side walls 16 are turned inwardly and terminate in longitudinal flanges 22 spaced from the side walls 16 and positioned within the channel 20. The pipe hanger 10 is positioned within the channel 20 and abuts the longitudinal flanges 22.

Figure 2:
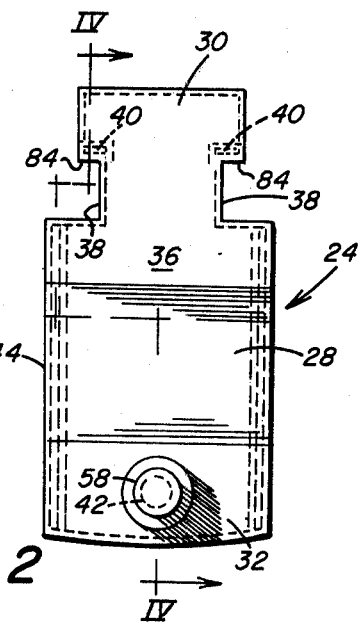
FIG. 2 is a view, in side elevation, of a first clamp member, illustrating a boot element for receiving the threaded end of the fastening element.
Figure 3:
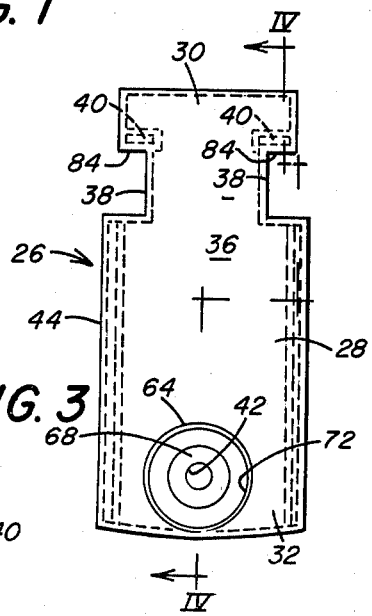
FIG. 3 is a view, in side elevation, of a second clamp member, illustrating a sealing flange element for receiving a cap of the fastening element.

The pipe hanger 10 includes a pair of complementary clamp members 24 and 26. Clamp member 24 is illustrated in FIG. 2, and clamp member 26 is illustrated in FIG. 3. FIG. 1 illustrates the assembled relation of clamp members 24 and 26 on the channel member 14. The clamp members 24 and 26 are shown in opposed relation prior to assembly in FIG. 4.

Figure 5:
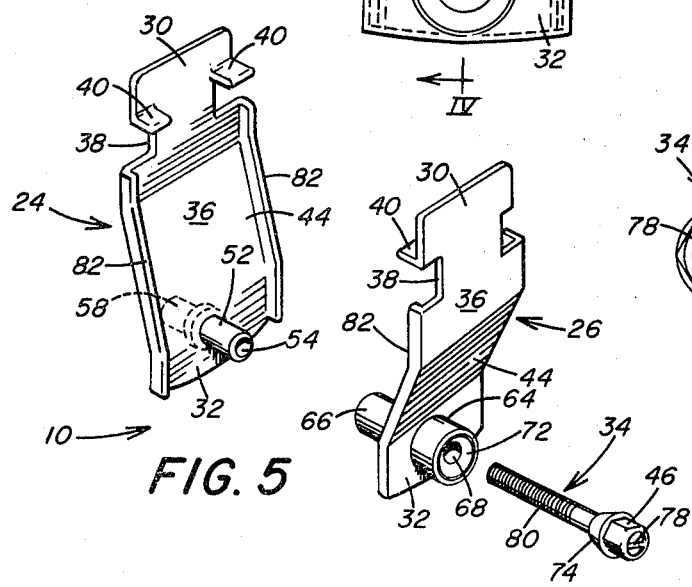
FIG. 5 is an isometric, exploded view of the pipe hanger, illustrating the coated clamp members positioned to receive the fastening element.

Each clamp member 24 and 26 includes a longitudinally extending body portion 28 having an engaging end portion 30 and a connecting end portion 32. The engaging end portion 30 is adapted for positioning on the longitudinal flanges 22 of the channel member 14. The connecting end portion 32 is adapted to receive a fastening element 34 illustrated in FIGS. 5 and 6 for drawing together the clamping members 24 and 26 into engagement with the periphery of the pipe 12.

An intermediate portion 36, having an arcuate configuration, extends between the engaging end portion 30 and the connecting end portion 32. The intermediate portion 36 is suitably contoured to receive, in a nesting position, the pipe 12 for the assembled pipe hanger 10 on the channel member 14, as illustrated in FIG. 1. With the present invention, the intermediate portion 36 is angled relative to the opposite end portions 30 and 32 so as to accommodate a range of pipe diameters permitting the hanger 10 to be used for more than a single pipe diameter. This is accomplished, as will be explained later in greater detail, by adjusting the distance between the clamp members 24 and 26 in the assembled pipe hanger 10.

Figure 4:
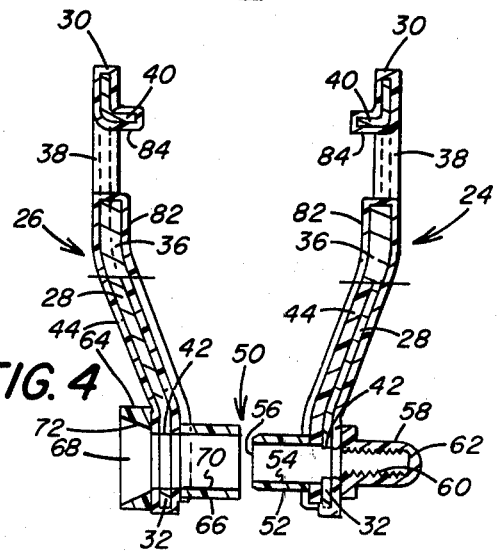
FIG. 4 is a view, in side elevation and partially in section, taken along the lines IV—IV of FIGS. 2 and 3, illustrating the clamp members in preassembled relation.

The engaging end portion 30 of each clamp member 24 and 26 has a slotted configuration, as illustrated in FIGS. 2 and 3, thereby defining a pair of oppositely positioned notches 38. The notches 38 have a vertical length greater than the length of the inturned ends of the channel member side walls 16 to facilitate insertion of the engaging end portion 30 into the channel 20. The longitudinal flanges 22 extend through the notches 38. As illustrated in FIGS. 1 and 4, the upper end portions of the notches 38 terminate in shoulders or tabs 40 that extend substantially perpendicular from the body portion 28. The shoulders 40 have a planar surface of a preselected length forming a bearing surface for positioning on the longitudinal flanges 22 of the channel member 14. In this manner, the clamp members 24 and 26 are securely anchored to the channel member 14.

To facilitate retention of the pipe 12 between the clamp members 24 and 26, each clamp member 24 and 26 includes a bore 42 extending through the respective connecting end portion 32. As illustrated in FIG. 4, the bores 42 are oppositely positioned to permit connection of the clamp members 24 and 26 and positioning in the channel 20. The threaded fastening element 34, such as a bolt or screw, extends through the aligned bores 42 to draw together the connecting end portions 32 so that the periphery of the pipe 12 is securely gripped and cradled between the clamp member intermediate portions 36. This arrangement is illustrated in FIG. 1.

Both clamp members 24 and 26, as well as a head 48 of the fastening element 34, are coated with a moisture resistant, polymeric material. As illustrated in FIG. 4, a polymeric coating 44 is bonded in a uniform thickness over the entire substrate of the clamp members 24 and 26. Thus, the clamp members 24 and 26 are completely encapsulated by a resilient moisture resistant coating. None of the metal substrate of the clamp members is exposed.

Figure 6:
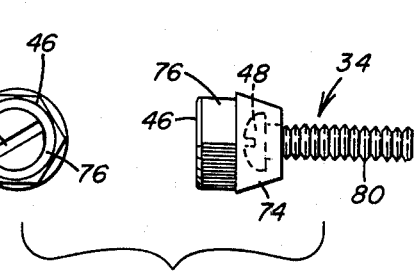
FIG. 6 is an end view and a side elevation of the fastening element, illustrating a polymeric cap surrounding the head of the fastening element.

In a similar arrangement, the fastening element 34, as illustrated in FIG. 6, is provided with a polymeric cap 46 that encapsulates the head 48 of the fastening element 34. The coatings 44 on the clamp members 24 and 26 and the cap 46 comprise a moisture proof, chemical resistant, impact resistant, polymeric composition. A suitable polymeric composition for use with the present invention is polyvinylchloride (PVC) but equivalent compositions may be also utilized, as for example, impact resistant nylon, polypropylene, polyurethane or polyethylene.

In this manner, the polymeric material is bonded to the substrate of the clamp members 24 and 26 and the screw head 48 by a molding process to obtain the desired thickness of the protective coating. The polymeric coating protects the respective elements from corrosive damage due to exposure to moisture and other deleterious environments which are known to damage the substrate of a conventional pipe hanger and "freeze" the bolted connection of the hanger plates.

The fastening element 34 that connects the end portions 32 of the clamp members 24 and 26 is completely enclosed by a seal structure generally designated by the numeral 50 in FIGS. 1 and 4. The seal 50 is formed as an integral part of the polymeric coating 44 molded on the substrate of the clamp members 24 and 26. Preferably, the polymeric coating 44 and the seal structure 50 on the clamp members 24 and 26 is formed by pressure molding of a polymeric material on the substrate of the clamp members 24 and 26. During the molding process, the seal structure 50 is formed at each connecting end portion 32 on opposed sides of the clamp member body portion 28 in surrounding relation with the bore 42.

The seal structure 50 is designed to permit selective spacing of the clamp connecting end portions 32 for a range of pipe diameters adapted to be engaged by the clamp members 24 and 26 while maintaining the fastening element 34 encapsulated to seal out corrosion. The seal structure 50 on the clamp member 24 extends outwardly from the bore 42 and includes a first or insert element 52 surrounding the bore 42. As seen in FIG. 4, the insert element 52 extends in axial alignment with bore 42. The insert element 52 includes a passageway 54 communicating with and extending from the bore 42. The passageway 54 has an opening 56 through which the fastening element 34 extends.

A second element of the seal structure 50 formed integral with the polymeric coating 44 on the clamp member 24 is a boot element 58. The boot element 58 extends outwardly from the opposite side of the clamp member 24 in surrounding relation with the bore 42. The boot element 58 includes an internal passageway 60 axially aligned with the bore 42 and the insert element passageway 54. The passageway 60 communicates with the bore 42 and has a closed end portion 62. Preferably, the bore 42 through the clamp member 24 is threaded to receive a threaded type of fastening element 34. The internal passageway 60 of the boot element 58 is also internally threaded to receive the threaded end of the fastening element 34, as illustrated in FIG. 4. The insert element 52 and boot element 58 are formed integral with the coating 44 on the clamp member 24.

In a similar arrangement, the seal structure 50 on the clamp member 26 includes elements that are also formed integral with the polymeric coating 44 on the substrate of the clamp member 26. The seal structure 50 of the clamp member 26 includes a sealing flange element 64 and a socket element 66. Both elements 64 and 66 are formed of the moisture resistant polymeric material. The elements 64 and 66 extend outwardly in surrounding relation with the bore 42 and are axially aligned with the bore 42. The sealing flange element 64 includes a passageway 68, and the socket element 66 includes a passageway 70. The passageways 68 and 70 combine with the bore 42 to receive the fastening element 34 which extends therethrough to connect with the other clamp member 24. Preferably, as illustrated in FIG. 4, the bore 42 and the passageways 68 and 70 are not threaded.

In accordance with the present invention, the passageway 70 of the socket element 66 of clamp member 26 is provided with an inner diameter greater than the outer diameter of the insert element 52 of clamp member 24. This arrangement permits the insert element 52 to telescope in the passageway 70 of the socket element 66 as the spacing between the connecting end portions 32 is adjusted to receive a pipe 12 of a preselected diameter within the size range for which the pipe hanger 10 is designed to accommodate. The insert element 52 is movable in the passageway 70 to increase and decrease the spacing between the connecting end portions 32 as required to securely engage the pipe 12 between the clamp members 24 and 26. Thus, an extensible sealed passageway for receiving the fastener element 34 extends between the clamp members 24 and 26 at the connecting end portions 32.

By adjusting the position of the insert element 52 in the socket element 66, the length of the sealed passageway is adjustable as required to threadedly receive the end of fastening element 34 in the threaded bore 42 and the boot element 58 to draw the connecting end portions 32 together to securely grip the pipe 12. This assures that the threaded shank and threaded end of the fastening element 34 remain sealed against the corrosive effects of moisture. The seal formed by the moisture resistant enclosure of insert element 52 positioned in socket element 66 is effective preliminary to installation of the hanger 10, during installation of the hanger 10, and after installation of the hanger 10.

The sealing flange element 64 on the clamp member 26 is preferably a resilient flange adapted to deform and engage, in sealing relation, the polymeric cap 46 of the fastening element 34. The sealing flange element 64 illustrated in FIGS. 3-5 has a preselected outer diameter. The passageway 68 has a conical configuration decreasing in diameter in the direction toward the bore 42. The resilient polymeric material surrounding the passageway 68 includes an internal sealing surface 72 operable to form a gasket-type seal with the polymeric cap 46. The polymeric cap 46 is molded on the fastener head 48 to form a conical sealing surface 74 complementary with the sealing surface 72 of the flange element 64. As illustrated in FIG. 6, the cap 46 includes an annular portion 76 that extends outwardly from the conical sealing surface 74. A conventional recess 78 is provided to accommodate advancement of the fastening element 34 through the sealing flange element 64, bore 42 of clamp member 26, the socket element 66, insert element 52, bore 42 of the clamp member 24 and into the boot element 58. With this arrangement, the fastening element 34 is retained in a moisture proof seal formed by the combined seal structure 50.

Preferably, the fastening element 34, as illustrated in FIG. 6, includes a threaded shank 80 having a length to accommodate the range of pipe diameters for which the pipe hanger 10 is designed. As the fastening element 34 is advanced through the bores 42 in the clamp members 24 and 26, the polymeric cap 46 is advanced into the conical passageway 68 of the sealing flange element 64. The cap 46 continues to advance to move the complementary surfaces 72 and 74 into sealing engagement to provide a moisture resistant seal around the polymeric cap 46 within the sealing flange element 64. The sealing surface 74 is deformed when contacted by cap surface 74 to complete the seal around the cap 46.

Preferably, the passageway 68 of cap 46 has a sufficient depth to permit the retention of a seal around the cap 46 during installation of the pipe hanger 10. Thus, an effective moisture resistant seal is provided before the fastening element 34 is completely tightened in the clamping member 24. Similarly, the center of the fastening element is sealed within the telescopically arranged elements 52 and 66 during installation. Also, the boot element 58 and the fastener 34 have a preselected length to assure that the end of the fastener remains encapsulated in a moisture resistant seal at all times during and after installation. In the event that the end of the fastening element 34 should bottom in the boot element 58, the resilient nature of the polymeric material forming the boot element 58 permits the boot element 58 to elongate to a degree without breaking through the closed end 62.

In accordance with the present invention, the pipe hanger 10 is adapted for installation on the channel member 14 by a manner in which all the components of the pipe hanger 10 including the clamp members 24 and 26 and the fastening element 34 remain encapsulated to seal out corrosion and other damaging effects. This prevents the components of the pipe hanger 10 from being initially exposed to moisture prior to and during the installation of the pipe hanger 10 on the channel member 14. By coating the clamp members 24 and 26 and providing the seal structure 50, the clamp members, as well as the means for connecting the clamp members to each other, are totally sealed to prevent corrosive damage and "freezing" of the clamp connection. This preserves the life of the pipe hanger 10 and minimizes repair and replacement normally necessitated when the pipe hanger is exposed to a corrosive environment.

The polymeric coating 44 encapsulating the clamp members 24 and 26 has a preselected thickness to substantially resist cutting of the coating 44 and exposure of the substrate. This is particularly applicable for the shoulders 40, which abut the channel member flanges 22 and at the flanged lips 82 of each clamp member 24 and 26, which contact the periphery of the pipe 12 to support the pipe between the clamp members 24 and 26. Preferably, the coating 44 is applied at the same thickness to the shoulders 40 and the flanged lips 82 as the coating applied to the remaining portions of the clamp members 24 and 26.

Coating the shoulder 40 provides a substantially planar bearing surface 84 that extends a preselected length on the channel flanges 22. This arrangement distributes the bearing load over an increased area serving to prevent puncture of the coating 44 at the point of contact with the channel flanges 22. A similar arrangement is provided by the flanged lips 82 that contact the pipe 12. Thus, the polymeric coating on the bearing surface 84 and the flanged lips 82 provide increased strength and rigidity for stabilizing the pipe 12 on the channel member 14. To prevent corrosion of the pipe 12, a polymeric material can also be applied to the pipe 12 to completely encapsulate the pipe in a moisture resistant seal. The pipe 12 is coated to a thickness to accommodate the coating applied to the pipe hanger 10. With this arrangement, in the event the polymeric coating on either the pipe hanger 10 or the pipe 12 should become punctured, a moisture resistant seal is maintained by the point of contact of the coating on the pipe with the coating on the abutting portion of the pipe hanger.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A conduit hanger comprising, a first clamp member and a second clamp member positioned in opposed spaced relation, each of said clamp members having a body portion including an engaging end portion for positioning on a structural support, a connecting end portion, and an intermediate portion, said intermediate portion having an arcuate configuration extending between the engaging end portion and the connecting end portion and adapted to receive and support a conduit, a moisture resistant, polymeric coating encapsulating said clamp member body portion, a bore extending through said connecting end portion of each of said clamp members, said coating forming a seal structure extending outwardly on opposed sides of each clamp member in surrounding relation with said bore, said seal structure being telescopically movable to form an extensible sealed passageway between said first and second clamp members, a fastening element connecting said first and second clamp members to move said connecting end portions toward one another to securely hold a conduit between said intermediate portions, and said fastening element extending through said bores and positioned within said sealed passageway to provide a moisture resistant seal around said fastening element.

2. A conduit hanger as set forth in claim 1 in which, said seal is adjustable in length between said first and second clamp members to retain said fastening element completely encapsulated in a moisture proof seal to permit positioning a conduit having as preselected diameter within a range of diameters between said first and second clamp member.

3. A conduit hanger as set forth in claim 1 in which, said fastening element has a shank portion and a head portion, said head portion being coated with a moisture resistant, polymeric material to form a cap having a sealing surface, said cap sealing surface being retained in sealing engagement with said coating surrounding said bore of a selected one of said clamp members, and said shank portion being retained within said extensible sealed passageway to prevent exposure of said fastening element to corrosive damage.

4. A conduit hanger as set forth in claim 1 in which said seal structure includes, said coating extending outwardly from one side of said first clamp member in surrounding relation with said bore to form a boot element for receiving and encapsulating the end of said fastening element, said coating extending outwardly from the opposite side of said first clamp member in alignment with said bore and said boot element to form an insert element for receiving said fastening element, said coating extending outwardly from one side of said second clamp member in surrounding relation with said bore to form a sealing flange element for sealingly engaging said fastening element, and said coating extending outwardly from the opposite side of said second clamp member in alignment with said bore and said sealing flange element to form a socket element adapted to receive said insert element.

5. A conduit hanger as set forth in claim 4 which, said insert element is telescopically movable in said socket element thereby forming said sealed passageway to retain said fastening element encapsulated in a moisture resistant enclosure extending between said first and second clamp members, and said insert element being selectively positioned within said socket element to provide a preselected spacing between said first and second clamp members for maintaining said fastening element completely encapsulated therebetween.

6. A conduit hanger as set forth in claim 4 which, said fastening element has a shank end portion and a head portion, said head portion being coated with a moisture resistant, polymeric material to form a cap having a sealing surface, said cap being retained within said sealing flange element such that said sealing surface sealingly engages said sealing flange element, and said shank end portion being retained within said boot element to provide a moisture resistant seal around said shank end portion.

7. A conduit hanger as set forth in claim 4 which, said insert element and said socket element are longitudinally movable relative to one another to provide a preselected spacing between said first and second clamp member to receive a conduit of a preselected diameter within a range of diameters and maintain said fastening element shank end portion completely sealed from the surrounding environment.

8. A conduit hanger as set forth in claim 4 which, said boot element is internally threaded, and said shank end portion being externally threaded for threaded advancement into said boot element to secure together said clamp connecting end portions.

9. A conduit hanger as set forth in claim 1 in which, said fastening element includes a cap end portion, and said seal structure includes a flexible sealing surface for sealingly engaging said cap end portion to prevent exposure of said cap end portion to the corrosive effects of moisture.

10. A conduit hanger as set forth in claim 1 in which, said engaging end portion includes a pair of oppositely positioned notches for receiving the structural support, each of said notches terminating in a shoulder, said shoulder having a bearing surface being coated with said polymeric material, and said coated bearing surface adapted to abut the structural support to rigidly secure said respective clamp member to the structural surface where the bearing load is distributed over said coated bearing surface.

11. A conduit hanger as set forth in claim 1 in which, said clamp intermediate portion includes a flanged surface coated with said polymeric material and adapted to receive and support a conduit.

12. A conduit hanger as set forth in claim 1 in which, said coating is molded on said respective clamp member body portion to a preselected thickness and thereby encapsulate said clamp member body portion within a moisture resistant seal.

* * * * *